Aug. 23, 1955
J. BIALY
2,715,849
THREAD CUTTING TOOL RELEASE
Filed April 20, 1953
2 Sheets-Sheet 1
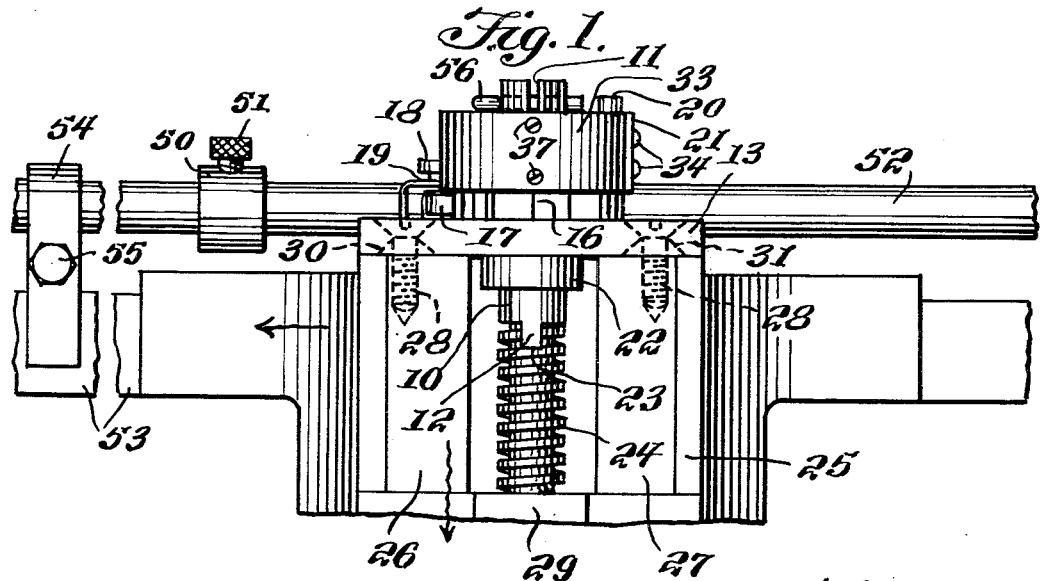
Fig. 1.
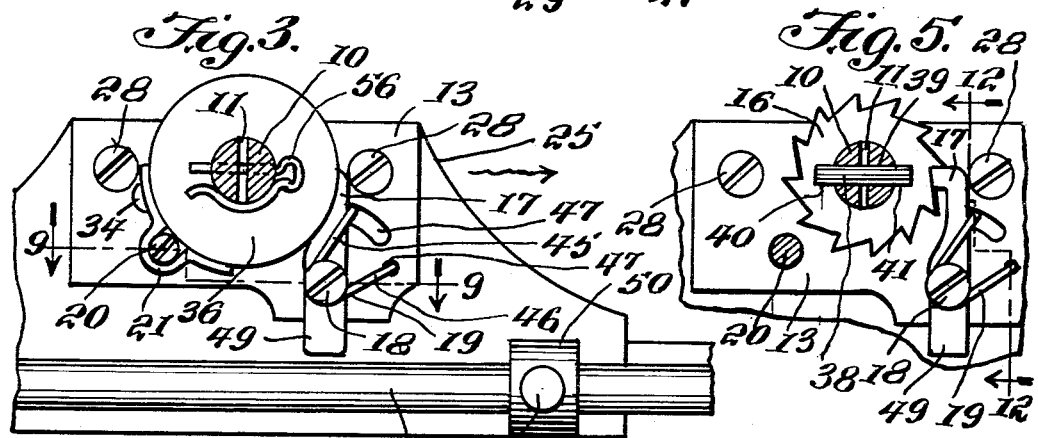
Fig. 3.
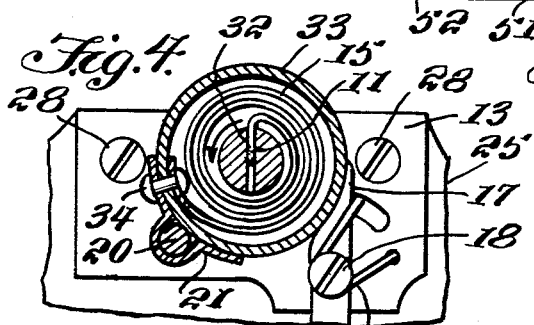
Fig. 4.
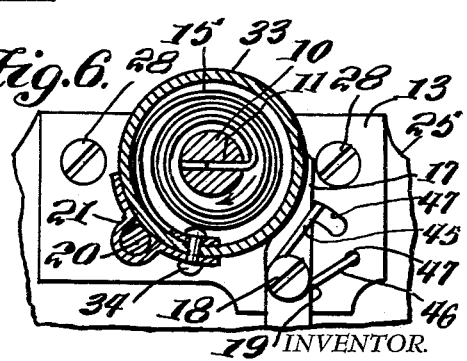
Fig. 5.
Fig. 6.
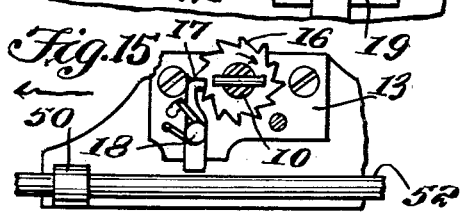
Fig. 15.
INVENTOR.
Joseph Bialy,
BY Victor J. Evans & Co.
ATTORNEYS

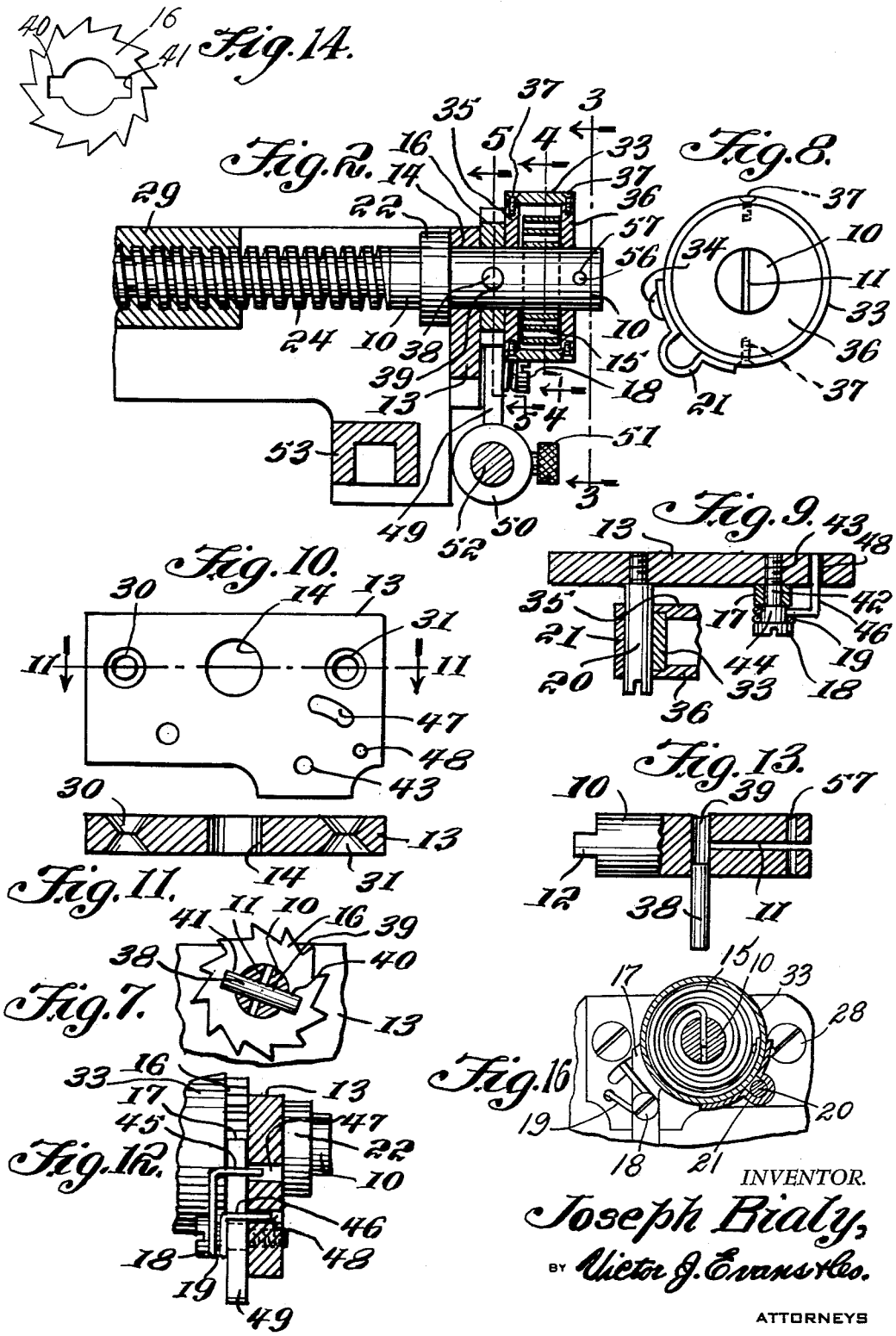

United States Patent Office 2,715,849
Patented Aug. 23, 1955

2,715,849

THREAD CUTTING TOOL RELEASE

Joseph Bialy, Buffalo, N. Y.

Application April 20, 1953, Serial No. 349,603

3 Claims. (Cl. 82—24)

This invention relates to single point threading tools, particularly for use on a cross feed of a lathe and in particular a tripping and reversing mechanism incorporated in the mounting of the feed screw of a lathe carriage whereby upon reaching the end of a thread a trip mechanism releases a spring that instantly actuates the rotation of the cross feed screw releasing and withdrawing the threading tool.

In threading from the end of a bolt or shaft inwardly, it is difficult to stop the threading tool abruptly at the end of the thread, and for this reason provision is made for clearance at the end of the cut. The most common method of providing such clearance is to cut an annular groove at the end of the thread, however, this provides a weak point in the shaft as the root of the groove is generally less than that of the thread. Various other methods such as drilling a hole in the shaft at the end of the thread are used. However, with such devices it is difficult to stop the threading tool exactly at the opening. The speed with which a thread can be cut in the conventional manner is limited by the amount of caution required by the operator upon reaching the end of the thread whereby the machine must be run very slowly or stopped in some manner to facilitate the actions required to release the cutting tool from the work. With these thoughts in mind, this invention contemplates a quick acting trip or release set at a predetermined point, whereby upon reaching the end of the thread the rotation of the cross feed screw of the carriage is instantly actuated and the thread cutting tool instantly released and withdrawn from the work.

The object of this invention is, therefore, to provide an automatic releasing mechanism at the end of a cross feed screw of a lathe carriage, whereby a threading tool is instantly released at a predetermined point from its cutting operation.

Another object of the invention is to provide a reversing mechanism for the cross feed screw of the carriage of a lathe in which the device may readily be adjusted for operation in cutting external and internal, right and left hand threads.

A further object of the invention is to provide a reversing attachment for the cross feed screw of a lathe carriage in which the device is adapted to be installed on machine tools now in use and also in which the attachment is of a simple and economical construction.

With these and other objects and advantages in view, the invention embodies a stub shaft journaled in a plate mounted at the rear of a lathe carriage with one of several means for connecting the end of the stub shaft to the cross feed screw of the carriage and with a coil spring and a ratchet wheel positioned on the stub shaft to be held by a pawl, whereby the spring is wound manually by rotation of the cross feed screw, and in which the pawl is positioned to engage a stop adjustably mounted on the machine, whereby upon engaging the stop the cross feed screw is automatically released, and the coiled spring reverses the direction of previous rotation of the screw, withdrawing the thread cutting tool.

Other features and advantages of the invention will appear from the following description taken in connection with the drawings, wherein:

Figure 1 is a plan view showing a portion of the far side or rear of a lathe carriage with the stop and reverse mechanism mounted thereon and with parts broken away.

Figure 2 is a longitudinal section through the portion of the carriage shown in Figure 1.

Figure 3 is an end elevational view taken on line 3—3 of Fig. 2 showing the end of the carriage and also showing the end of the stub shaft in section.

Figure 4 is a cross section through the spring housing taken on line 4—4 of Fig. 2, also with parts broken away.

Figure 5 is a similar section taken on line 5—5 of Fig. 2 illustrating the relative positions of the ratchet wheel and pawl.

Figure 6 is a cross section similar to that shown in Fig. 4, showing the coils of the spring reversed such as is required for internal threading.

Figure 7 is a view similar to that shown in Fig. 5 showing the position of the ratchet wheel reversed for internal threading.

Figure 8 is an end elevational view looking toward the end of the spring housing, particularly as shown in Fig. 2.

Figure 9 is a sectional plan taken on line 9—9 of Fig. 3, illustrating the connection of the spring housing to the mounting plate and showing the pawl actuating spring pin.

Figure 10 is an elevational view showing the mounting plate for securing the attachment on the ends of the lathe carriage, all other parts being removed.

Figure 11 is a sectional plan taken on line 11—11 of Fig. 10, showing a section through the mounting plate.

Figure 12 is a detail showing a section taken on line 12—12 of Fig. 5, also showing the mounting of the pawl actuating spring.

Figure 13 is a combination elevation and sectional view illustrating the stub shaft by which the attachment is mounted on the end of the cross feed screw of the lathe carriage, and showing the ratchet wheel holding pin partially extended therefrom.

Figure 14 is a side elevational view illustrating the ratchet wheel.

Figure 15 is a section similar to that shown in Fig. 5, showing the positions of the parts reversed for left hand internal threading, the parts being shown on a reduced scale.

Figure 16 is a view similar to that shown in Fig. 4 with the positions of the parts reversed such as is also required for left hand threading.

Referring now to the drawings wherein like reference characters denote corresponding parts the improved rapid tool release and reversing mechanism of this invention includes a stub shaft 10 having a slot 11 in one end and a tongue 12 extended from the opposite end, a mounting plate 13 having an opening 14 in which the stub shaft is journaled, a coil spring 15 mounted on the outer portion of the shaft 10, a ratchet wheel 16 also mounted on the shaft 10, a pawl 17 pivotally mounted on a pin 18 and resiliently held by a spring 19, and a stud 20 on which a casing around the spring is mounted with a clamp 21.

A collar 22 is pressed on the shaft 10 and positioned to engage the inner surface of the mounting plate 13 to provide a stop whereby the tongue 12 of the stub shaft 10 is in engagement with a slot 23 of a cross feed screw 24 of a lathe carriage 25 with the mounting plate 13 secured to the ends of the sections 26 and 27 of the lathe carriage by screws 28.

By this means the attachment is mounted on the far end of the lathe carriage or at the rear of the machine and the device is adapted to operate with a holder for a tool bit mounted on the trailing face 29 of the lathe carriage.

The mounting plate 13 is provided with bolt holes or openings 30 and 31, which are countersunk in both sides to receive the conical-shaped heads of the screws 28 whereby the position of the mounting plate 13 is reversible.

The slot 11 in the outer end of the stub shaft 10 is positioned to receive a flat end 32 of the spring 15 and with the opposite end of the spring secured to a cylindrical section 33 of the spring casing with a rivet 34 which also secures the clamp 21 in position on the section of the casing, the spring will wind as the stub shaft and feed screw rotate in a counterclockwise direction from the position shown in Fig. 4.

The cylindrical section 33 of the spring casing is mounted on the stub shaft 10 with end plates or discs 35 and 36 to which the section 33 is secured by a screw 37.

The ratchet wheel 16, which is positioned between the mounting plate 13 and the spring casing is keyed to the stub shaft 10 with a pin 38 that is slidably mounted in a transversely positioned opening 39 in the stub shaft 10 and that is positioned whereby the ends extend into notches 40 and 41 in the ratchet wheel. With the ratchet wheel mounted in this manner it is rotated with the shaft and may be removed and replaced to facilitate reversing the direction of rotation thereof.

The pawl 17 is pivotally mounted on an intermediate section 42 of the pin 18 which is threaded in an opening 43 of the mounting plate 13 and the pawl is urged into engagement with the teeth of the ratchet wheel by the spring 19 which is coiled around a section 44 of the pin 18 and which is provided with L-shaped ends 45 and 46. The end 45 extends into an arcuate slot 47 in the mounting plate whereby the upper end of the pawl is permitted to snap over the teeth of the ratchet wheel and the end 46 is held substantially stationary in an opening 48, also in the mounting plate.

The pawl 17 is provided with an extension 49 that is positioned to engage a set collar 50 which is adjustably secured by a screw 51 on a rod 52 at the back of the machine. The rod 52 is mounted on the machine frame 53 by clamps 54 through which bolts 55 extend.

The spring casing is retained in position on the stub shaft 10 with a spring pin 56 that extends through an opening 57 that is spaced from the outer end of the shaft.

With the parts mounted on the lathe carriage in this manner a conventional threading operation may be performed. The cross feed screw of the lathe is turned approximately one turn for an average screw thread and as it is turned it advances the threading tool at the same time rotating the ratchet 16 through the stub shaft 10 and winding the spring 15. The pawl 17 prevents the spring in returning the cross feed screw to its original position. The micrometer collar on the cross feed screw is adjusted to a reference mark to be used as an indexed position for setting the cross feed screw at the start of all succeeding cuts. The compound rest feed screw is advanced until the tool touches the work, and henceforth is used for all adjustments in obtaining the desired depth of each successive cut. The release collar 50 is adjusted to a position corresponding to the end of the thread to be cut. The first cut on the work is now taken, and as the carriage travels, the extension 49 of the pawl 17 strikes the release collar, whereby the pawl is actuated to release the ratchet wheel and spring 15 which, in turn actuates the rotation of the cross feed screw instantly retracting the cutting tool. The lathe carriage is moved to the starting point, the cross feed screw turned to the reference mark, the compound rest feed screw advanced, and cycle of operations repeated until the thread is completed.

As illustrated in Figure 6, the position of the spring 15 may be reversed for internal threading and, with the parts formed in this manner the entire mounting plate 13 with the ratchet wheel and spring may be reversed by turning the parts to the positions shown in Figs. 15 and 16.

The spring pin 56 is used as a rapid means in facilitating reversal of parts for different threading applications.

The removal of two mounting screws 28 is all that is required in dismounting the complete unit for returning the lathe to its normal function.

It will be understood that modifications, within the scope of the appended claims, may be made in the design and arrangement of the parts without departing from the spirit of the invention.

What is claimed is:

1. A reversing attachment for a cross feed screw of a lathe carriage comprising a coil spring, means for connecting the coil spring to the cross feed screw whereby rotation of the screw winds the spring, a ratchet for holding the spring, and a stop mounted on the lathe and positioned to release the ratchet during carriage movement whereby the spring rotates the cross feed screw, reversing the direction of rotation of said screw.

2. A reversing attachment for a cross feed screw of a lathe carriage comprising a coil spring, means for connecting the coil spring to the cross feed screw whereby rotation of the screw winds the spring, a ratchet for holding the spring, a stop mounted on the lathe and positioned to release the ratchet during carriage movement whereby the spring rotates the cross feed screw, reversing the direction of rotation of said screw, and a reversible mounting plate attached to the rear end of a lathe carriage and upon which the ratchet and spring are positioned.

3. In a tool release and reversing attachment, the combination which comprises a mounting plate adapted to be attached to a lathe carriage, a stub shaft journaled in said mounting plate and having a tongue on an end extended into the lathe carriage, said tongue adapted to be connected to a cross feed screw of the carriage, a coiled spring positioned around said stud with one end connected to the stud and the other to the mounting plate, a ratchet wheel keyed to the stud, a pawl pivotally mounted on the mounting plate and positioned to engage the teeth of said ratchet wheel, and a set collar mounted on a rod at the back of a lathe upon which the carriage is positioned and positioned to be engaged by said pawl.

References Cited in the file of this patent

UNITED STATES PATENTS

| | | |
|---|---|---|
| 793,873 | Cornell | July 4, 1905 |
| 796,171 | Ambrose | Aug. 1, 1905 |
| 2,364,241 | Pedersen | Dec. 5, 1944 |
| 2,482,786 | Mack | Sept. 27, 1949 |